United States Patent
Pan et al.

(10) Patent No.: US 10,511,183 B2
(45) Date of Patent: Dec. 17, 2019

(54) SYSTEM, APPARATUS AND METHOD FOR OPTIMIZING WIRELESS CHARGING VIA LOAD MODULATION

(71) Applicant: SHENZHEN YICHONG WIRELESS POWER TECHNOLOGY CO. LTD., GuangDong (CN)

(72) Inventors: Siming Pan, San Jose, CA (US); Dawei He, Burlingame, CA (US); Tun Li, San Jose, CA (US)

(73) Assignee: SHENZHEN YICHONG WIRELESS POWER TECHNOLOGY CO., LTD, Shenzhen (CN)

(*) Notice: Subject to any disclaimer, the term of this patent is extended or adjusted under 35 U.S.C. 154(b) by 258 days.

(21) Appl. No.: 15/368,495

(22) Filed: Dec. 2, 2016

(65) Prior Publication Data
US 2018/0159352 A1 Jun. 7, 2018

(51) Int. Cl.
| | |
|---|---|
| *H02J 7/00* | (2006.01) |
| *H02J 7/02* | (2016.01) |
| *H02J 50/80* | (2016.01) |
| *H02J 50/90* | (2016.01) |
| *H02J 50/12* | (2016.01) |

(52) U.S. Cl.
CPC ............. *H02J 7/025* (2013.01); *H02J 50/12* (2016.02); *H02J 50/80* (2016.02); *H02J 50/90* (2016.02)

(58) Field of Classification Search
CPC ....................................................... H02J 7/025
USPC .................................................................. 320/108
See application file for complete search history.

(56) References Cited

U.S. PATENT DOCUMENTS

| | | | | | |
|---|---|---|---|---|---|
| 5,455,466 | A  | * | 10/1995 | Parks | H02J 7/025 307/104 |
| 6,016,046 | A  | * | 1/2000 | Kaite | H01M 10/46 320/108 |
| 6,124,700 | A  | * | 9/2000 | Nagai | H02J 7/0052 320/130 |
| 7,109,682 | B2 | * | 9/2006 | Takagi | H02J 7/0054 320/108 |
| 2009/0140691 | A1 | * | 6/2009 | Jung | H02J 7/0027 320/108 |
| 2013/0057078 | A1 | * | 3/2013 | Lee | H02J 7/00 307/104 |
| 2014/0306654 | A1 | * | 10/2014 | Partovi | H02J 7/025 320/108 |
| 2016/0204642 | A1 | * | 7/2016 | Oh | H02J 17/00 320/108 |

* cited by examiner

*Primary Examiner* — Yalkew Fantu
(74) *Attorney, Agent, or Firm* — Loza & Loza, LLP; Peter Zura (57) ABSTRACT

A wireless charging system, including a power transmitter configured to generate wireless energy, and a power receiver configured to receive wireless energy at a predetermined carrier frequency that could be fixed or tuned during operation. A controller, wherein the controller is configured to activate when the power receiver receives the wireless energy. The controller may be configured to control a load modulation element to generate one or more signals containing relevant information for system operation and performance optimization, and wherein the one or more signals are transmitted via the power receiver.

20 Claims, 7 Drawing Sheets

SYSTEM, APPARATUS AND METHOD FOR OPTIMIZING WIRELESS CHARGING VIA LOAD MODULATION

FIELD OF THE DISCLOSURE

The present disclosure relates to optimizing wireless charging. More specifically, the present disclosure relates to optimizing load modulation for multi-coil transmitter and multi receiver systems. Furthermore, the present disclosure relates to circuits and tunable systems to improve the sensitivity of position detection for wireless charging.

BACKGROUND

Wireless power transfer (WPT) or wireless energy transmission is the transmission of electrical power from a power source to a receiving device without using solid wires or conductors. Generally, the term refers to a number of different power transmission technologies that use time-varying electromagnetic fields. In wireless power transfer, a transmitter device is connected to a power source, such as the mains power line, and transmits power by electromagnetic fields across an intervening space to one or more receiver devices, where it is converted back to electric power and utilized. Wireless power transfer techniques may fall into two categories, non-radiative and radiative.

In near-field or non-radiative techniques, power may be transferred over short distances by magnetic fields using inductive coupling between coils of wire, or by electric fields using capacitive coupling between electrodes, for example. Using these techniques, it may be possible to transfer power wirelessly within two meters distance with an efficiency of 70% at a frequency of 100 kHz. Applications of this type include, but are not limited to, cell phone, tablets, laptops, electric toothbrush chargers, RFID tags, smartcards, and chargers for implantable medical devices like artificial cardiac pacemakers, and inductive powering or charging of electric vehicles like cars, trains or buses. In radiative or far-field techniques, sometimes called "power beaming", power may be transmitted by beams of electromagnetic radiation, like microwave or laser beams. These techniques can transport energy longer distances but are typically aimed at the receiver.

Numerous standardized technologies have been developed over the years, including, but not limited to, Alliance for Wireless Power ("A4WP") which is based on an interface standard ("Rezence") for wireless electrical power transfer based on the principles of magnetic resonance, where a single power transmitter unit (PTU) is capable of charging one or more power receiver units (PRUs). The interface standard supports power transfer up to 50 Watts, at distances up to five centimeters. The power transmission frequency may be 6.78 MHz, and up to eight devices can be powered from a single PTU depending on transmitter and receiver geometry and power levels. A Bluetooth Smart link may be provided in an A4WP system for controlling power levels, identification of valid loads, and protection of non-compliant devices.

Another standardized WPT technology includes "Qi" which relies on electromagnetic induction between planar coils. A Qi system may include a base station, which is connected to a power source and provides inductive power, and a device that consumes inductive power. The base station may include a power transmitter having a transmitting coil that generates an oscillating magnetic field; the device may include a power receiver holding a receiving coil. The magnetic field from the transmitter may induce an alternating current in the receiving coil by Faraday's law of induction. A further standardized WPT technology includes "Powermat" adopted by the Power Matters Alliance (PMA), which is based upon inductively coupled power transfer, where a transmitter may vary current in a primary induction coil to generate an alternating magnetic field from within a charging spot. The receiver in the consuming device may have its own induction coil that takes power from the magnetic field and converts it back into electrical current to charge the device battery. An additional part of the technology is the use of system control communication via Data over Coil (DoC), where the receiver may send feedback to the transmitter by changing the load seen by the transmitter coil. The protocol is frequency based signaling, thus enabling fast response of the transmitter.

In WPT systems, it is often necessary to place a consuming device, having a receiver antenna, within the general area and range of a WPT transmitter in order to receive power. While adequate power may be provided when the consuming device is physically placed in the general area and range of the WPT transmitter, the placement may not be optimal, which may result in less-than optimal power transfer. Accordingly, technologies are needed to improve WPT, particularly from the transmitter side. Additionally, reliable and precise location detection is needed for optimizing system performance and user experience as well as enabling enlarged charging areas for multi-coil power charging configurations.

SUMMARY

Accordingly, in some illustrative embodiments, a wireless charging system is disclosed, comprising a power transmitter configured to generate wireless energy; a power receiver configured to receive wireless energy at a predetermined carrier frequency that could be either fixed or tuned during operation; and a controller, wherein the controller is configured to activate when the power receiver receives the wireless energy, and wherein the controller is configured to control a load modulation element to generate one or more signals containing relevant information for system operation and performance optimization, and wherein the one or more signals are transmitted via the power receiver.

In some illustrative embodiments, a method is disclosed for operating a wireless charging system, comprising the steps of configuring a power transmitter to generate wireless energy; configuring a power receiver to receive wireless energy at a predetermined carrier frequency that could be either fixed or tuned during operation; activating a controller when the power receiver receives the wireless energy; controlling, via the controller, a load modulation element to generate one or more signals containing relevant information for system operation and performance optimization, and wherein the generated one or more signals are transmitted via the power receiver.

In some illustrative embodiments, a power receiver configured to receive wireless energy is disclosed, comprising an input comprising one or more charging windings for receiving wireless energy at a predetermined carrier frequency that could be either fixed or tuned during operation; a rectification circuit, operatively coupled to the input; a load modulation circuit, operatively coupled to the rectification circuit; and a controller, operatively coupled to the load modulation circuit, wherein the controller is configured to activate when the input receives the wireless energy, and wherein the controller is configured to control a load modulation element to generate one or more signals containing relevant information for system operation and performance optimization, and wherein the one or more signals are transmitted via the charging windings.

BRIEF DESCRIPTION OF THE FIGURES

The present disclosure will become more fully understood from the detailed description given herein below and the accompanying drawings which are given by way of illustration only, and which thus do not limit the present disclosure, and wherein.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Figure 1:
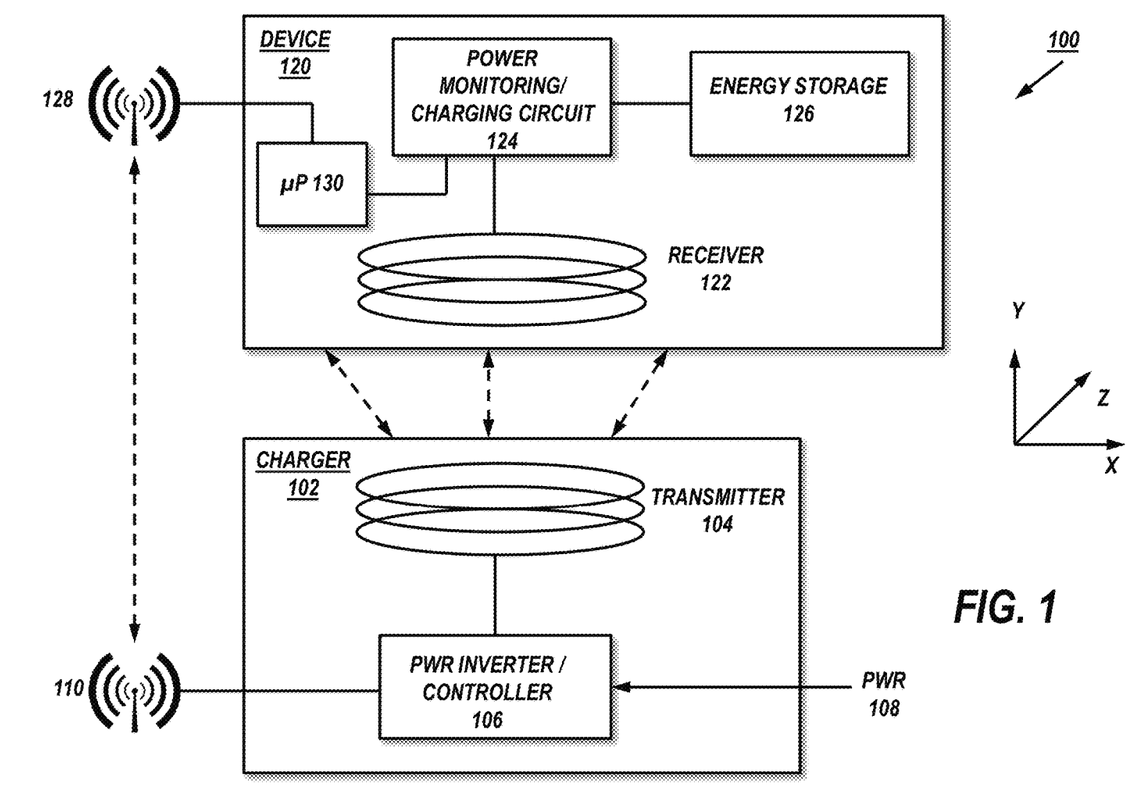
FIG. 1 shows a WPT system comprising a charger and a device configured to receive wireless power transmission under an illustrative embodiment.

Turning now to FIG. 1, a WPT system 100 is shown under an illustrative embodiment, including a charger 102 and a device 120 comprising an energy storage apparatus, such as battery 126. In one non-limiting example, device 120 may be an electronic device, such as a smart phone, table, laptop, medical device, power tool, and the like. In another non-limiting example, device 120 may be a car, bus, train, etc. It should be understood by those skilled in the art that device 120 may be any device capable of being configured to receive WPT signals to power device 120 and/or recharge an energy storage apparatus (e.g., 126).

In the example of FIG. 1, charger 102 may include a power inverter/controller 106 (hereafter "controller") that receives power from power source 108. Power source 108 may be mains power or any other suitable power source. Controller 106 may include, but is not limited to, power inverter circuitry, amplifier circuitry, oscillator circuitry, filter circuitry, impedance-matching circuitry, power control circuitry, processor circuitry, controllers and the like for generating and controlling power for transmission via transmitter 104 to receiver 122, which may be configured as coils, plates, magnetic armatures, and the like.

In some illustrative embodiments, transmitter 104 and receiver 122 may include a single coil configured to provide magnetic resonance and/or magnetic induction charging. In some illustrative embodiments, transmission coil 104 and receiver may include a plurality of coils that may be configured in an overlapping and/or non-overlapping arrangement to provide magnetic resonance or magnetic induction charging. In some illustrative embodiments, transmitter 104 and receiver 122 may include electrodes, such as a plates, configured to transmit and couple power via electric induction. In some illustrative embodiments transmitter 104 and receiver 122 may transmit and couple power using magnetodynamic coupling using rotating armatures, which rotate synchronously, coupled together by a magnetic field generated by magnets on the armatures.

In some illustrative embodiments, controller 106 may include communications circuitry to allow controller 106 to communicate in a wired or wireless manner (e.g., WiFi, Bluetooth, infrared, etc.) with device 120. Communications circuitry of controller 106 may include a wireless antenna 110 for communicating data with wireless antenna 128 of device 120. Communicated data may include device-specific information and power feedback data from device 120, where the power feedback data may include data relating to power transfer efficiency, link efficiency, quality factor(s), and the like. Power feedback data may be alternatively provided through an RF power transfer link using a subcarrier communication band suitable for packet-based communication using the transmitter 104 and receiver 122 pair directly.

In some illustrative embodiments, device 120 may include power monitoring and charging circuitry 124 that may be coupled to a processor 130 and energy storage 126, which may operate as a load in some illustrative embodiments. Power monitoring and charging circuitry 124 may include, but is not limited to, RF circuitry, rectifier circuitry, impedance matching circuitry, which may be configured to form an impedance matching network with controller 106, filter circuitry, communication circuitry for communicating via wireless antenna 128 and charging circuitry for providing power to energy storage 126. Power monitoring and charging circuitry 124 may also be coupled to processor 130 that may be configured to store and execute algorithms for measuring and/or calculating characteristics of the power being received (e.g., power transfer efficiency, link efficiency, quality factor(s), etc.) and provide it as feedback via wireless antenna 128 or other suitable means.

In an illustrative embodiment, device 120 may be placed within proximity of charger 102 in order to receive WPT signals in receiver 122, which is processed/converted in power monitoring and charging circuit 124 and provided to energy storage 126 for subsequent use. While not explicitly shown in FIG. 1, energy storage 126 may be coupled to other electronics within device 120 in one embodiment to provide operative power. During transfer of WPT, it may be advantageous that the transmitter 104 and receiver 122 be physically aligned along the x, y, and/or z axis to ensure that excessive signal loss is not introduced as a result of misalignment in any of the axes, which in turn may materially affect power signal transfer and efficiency.

Figure 1A:
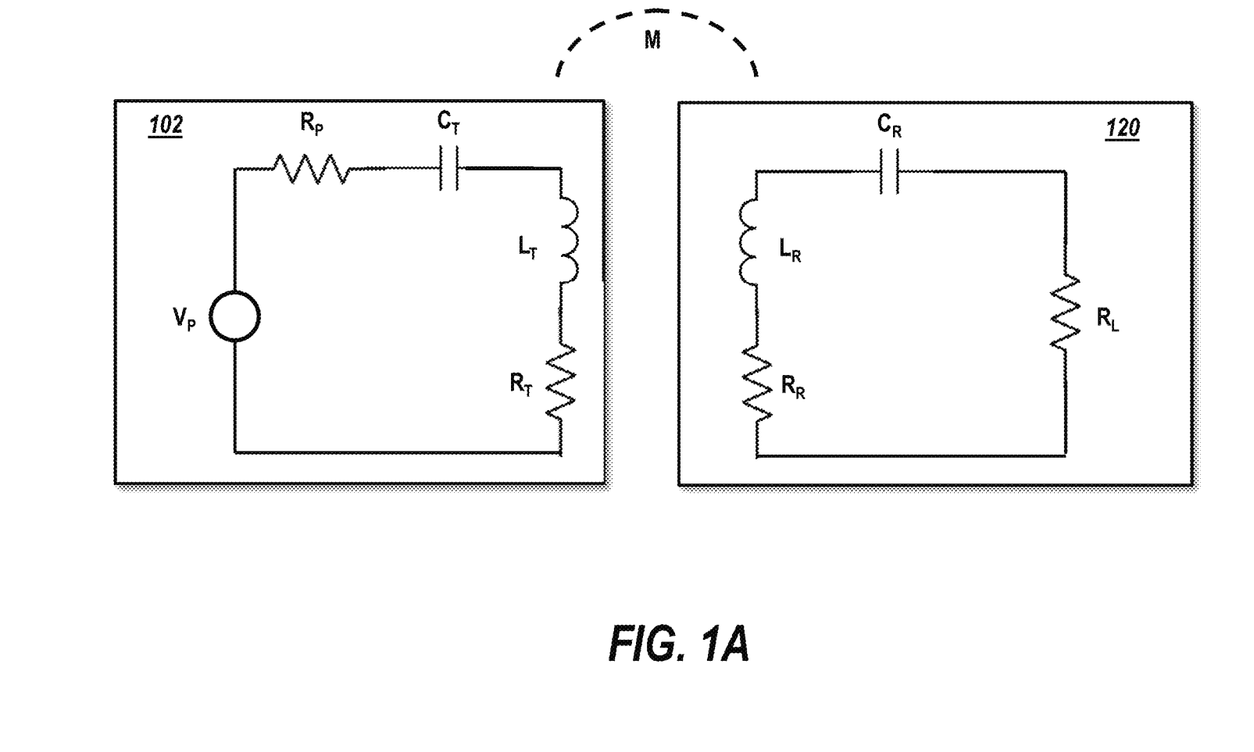
FIG. 1A shows an equivalent circuit of the WPT circuit portions of the system of FIG. 1 under an illustrative embodiment.

Turning to FIG. 1A, an equivalent circuit is shown using portions of the WPT system 100 of FIG. 1, where, in this non-limiting example, the transmitter 104 and receiver 122 are configured as resonating WPT circuits. Transmitter 102 may include a voltage source with amplitude $V_P$ at frequency ω and having power source resistance $R_P$. The voltage source may be coupled to a transmitter resonator circuit that may include capacitor $C_T$, inductor $L_T$ and resistor $R_T$. Energy may oscillate at a resonant frequency between inductor $L_T$ (representing energy stored in the magnetic field) and capacitor $C_T$ (representing energy stored in the electric field) and may be dissipated in resistor $R_T$. The resonator circuit of transmitter 102 may be coupled through mutual inductance (M) to inductor $L_R$ of receiver 120, which may similarly resonate using circuit $C_R$ and $R_R$ to provide power to load $R_L$.

Generally speaking, a resonator (e.g., 104, 122) may be described by multiple parameters, including, but not limited to, its resonant frequency ω and its intrinsic loss rate Γ. The ratio of these parameters may be used to determine a quality factor, or Q of the resonator, where Q=ω/2Γ to measure how well a resonator stores energy. The resonant frequency and quality factor for the transmitter and receiver (T, R) resonators may be expressed as $$\omega_{(T,R)} = \frac{1}{2\pi\sqrt{L_{(T,R)}C_{(T,R)}}}, \text{ and}$$

$$Q = \frac{\omega_{(T,R)}}{2\Gamma} = \sqrt{\frac{L_{(T,R)}}{C_{(T,R)}}} \frac{1}{R_{(T,R)}} = \frac{\omega_{(T,R)}L_{(T,R)}}{R_{(T,R)}}$$

From FIG. 1A, the transmitter (e.g., 104) and receiver (e.g., 122) coils may be represented by inductors $L_T$ and $L_R$, respectively, that may be coupled through mutual inductance M, where $M=k\sqrt{L_T L_R}$, where k is a coupling coefficient or energy coupling rate. Each coil may have a series capacitor ($C_T$, $C_R$) to form a resonator. Resistances $R_T$ and $R_R$ may be considered parasitic resistances that include all ohmic, dielectric, and radiative losses of the respective coil and resonant capacitor. The load, which may be energy storage 126 is represented in this example by $R_L$.

Power delivered to the load (e.g., $R_L$) may be determined by dividing the maximum power available from the transmitter when both the transmitter and receiver are resonant at ω, or $$\frac{P}{P_{T,max}} = \frac{4 \cdot U^2 \frac{R_P}{R_T} \frac{R_L}{R_R}}{\left(\left(1+\frac{R_P}{R_T}\right)\left(1+\frac{R_L}{R_R}\right)+U^2\right)^2}$$

where U may be considered the performance metric ("figure of merit") for the system and may be expressed as $$U = \frac{\omega M}{\sqrt{R_T R_R}} = \frac{k}{\sqrt{\Gamma_T \Gamma_R}} = k\sqrt{Q_T Q_R}.$$

Impedance matching (e.g., using an impedance transformation network) may be used to match resistances as closely as practicable to improve initial efficiency (e.g., $R_T/R_R = \sqrt{1+U^2}$), where the efficiency of the power transfer may be maximized according to $$\eta_{opt} = \frac{U^2}{\left(1+\sqrt{1+U^2}\right)^2}$$

where higher-efficiency energy transfer may be achieved with higher values of U. Efficiency may also be based on energy loss rates within a receiver ($\Gamma_R$), and/or may be based on a magnetic coupling coefficient (k) between the resonators and the resonator quality factors for the transmitter and receiver ($Q_T$, $Q_R$) as follows:

$$U = \frac{\omega M}{\sqrt{R_T R_R}} = k\sqrt{Q_T Q_R}$$

By using the resonator quality factors and the range of metric coupling between the transmitter and receiver for a specific application, the efficiency of a WPT could readily be determined.

Figure 2:
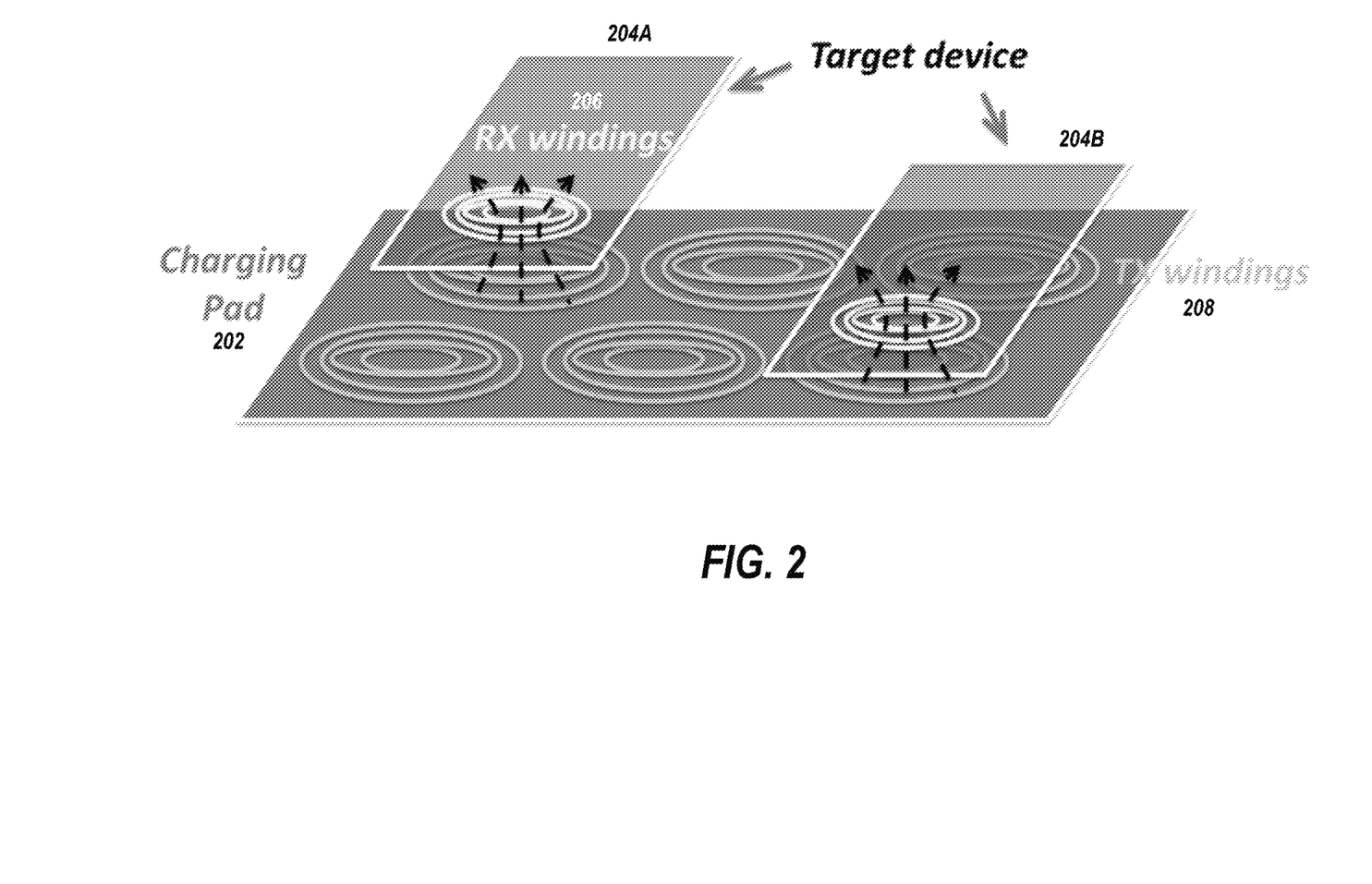
FIG. 2 shows a WPT system for utilizing load modulation in a multi-coil wireless charge configuration under an illustrative embodiment.

FIG. 2 shows a simplified illustrative example of a multi-coil charger in the form of a charging pad 202 having a plurality of transmitter windings 208 that provide wireless charging energy during operation to receiver windings 206 of one or more target devices (204A, 204B). As will be explained in further detail below, load modulation may be used in the transmitter and receiver to detect the location of each target device in the multi-coil system without requiring extra sensing elements. In an exemplary embodiment, a target device in proximity to a charging pad 202 causes only one or more of the nearest charging windings to wake up, leaving the remaining windings in a sleep mode or inactive. Accordingly, this technique may improve the efficiency of the charging pad as a whole. As an example, when a target device (e.g., 204A) moves to a location near one TX winding, the magnetic flux from this TX winding will trigger RX winding load modulation in this device. Using load modulation, the device, via the RX winding, may send the identification information to the charging pad 202, if this location is in the predetermined space, the charging pad can read the identification information. Then, a charging process may be initiated.

Figure 3:
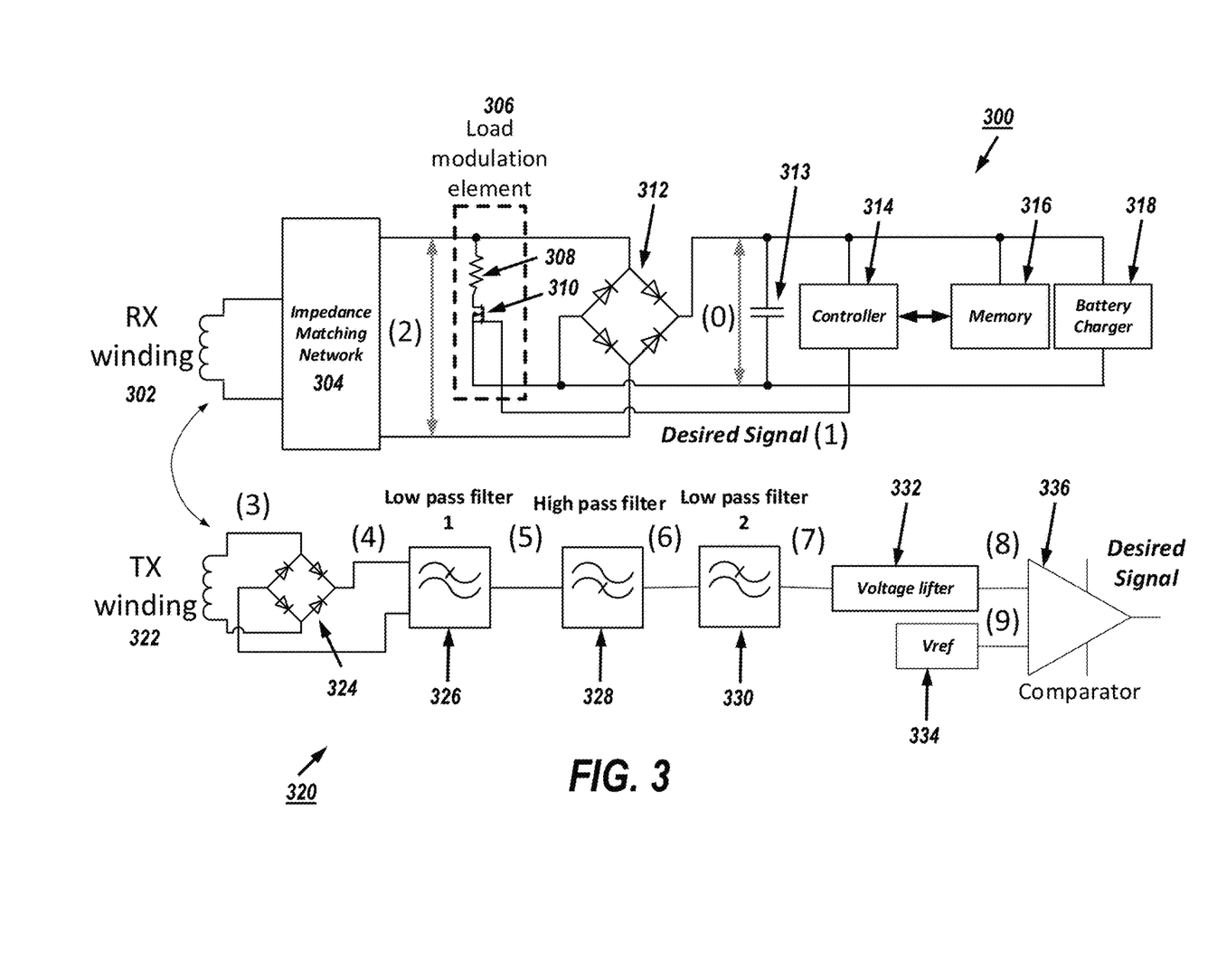
FIG. 3 shows a transmitter (TX) and receiver (RX) circuit configured to utilize load modulation for improving wireless charging under an illustrative embodiment.

Turning to FIG. 3, an illustrative charging system is shown having a receiver 300 and transmitter 320. Receiver 300 may be part of a device, such as a computing device or mobile device, and transmitter 320 may be part of a charging device or system. The receiver 300 may comprise an RX winding 302 that is coupled to impedance matching network 304 that is further coupled to diode bridge 312 and filer 313 which is illustrated as a capacitor. Load modulation element 306 may be configured to be coupled to the impedance matching network 304 via a resistor 308 coupled to a drain terminal of switch (e.g., MOSFET) 310, which has its source terminal coupled to the diode bridge 312 and battery charger 318. If switch 310 $R_{DS}$(on) has similar value of 308 resistor, then 308 is not necessary. The drain terminal of switch 310 is coupled to controller 314 as shown in the figure, wherein controller 314 may be configured to provide control signals to activate/deactivate switch 310 using a control program provided in memory 316.

Transmitter 320, including the load modulation part shown in FIG. 3, may comprise transmitter windings 322 coupled to diode bridge 324 whose output may be coupled to a first low pass filter 326, followed by high pass filter 328 and second low pass filter 330 as shown. The output of the second low pass filter 330 is coupled to voltage lifter circuit 332, which provides a first input to comparator 336, which compares this signal to a reference voltage provided by 334 to provide a desired output signal.

During operation, energy may be transferred from transmitter via TX winding 322 to the receiver's RX windings 302 at a predetermined carrier frequency (e.g., 100 KHz, 350 KHz, 6.78 MHz). The carrier frequency may be fixed or tuned during operation. The energy received in receiver 300 via RX windings 302 is then rectified via diode bridge 312 and used to power on controller 314. Once powered, controller 314 operates to control the impedance of the load modulating element 306 by turning on and off switch 310, which may effectively produce a series of signals containing certain information (e.g., one or more codes) regarding receiver 300 (a desired signal), which may be reflected from RX winding 302 as a result of the envelope of the RX winding 302 voltage changing. It is noted that the resistance of resistor (308) in the load modulation element 306 may be varied to determine how strong the load modulation may impact the envelope of the AC voltage across the TX winding. Generally speaking, the smaller the resistance, the stronger the impact of the envelope of the AC voltage across the TX winding will be.

The envelope change being reflected to the TX side voltage at location (3) in FIG. 3 provides information regarding the desired signal generated by the receiver 300 and may be delivered to the TX side mixed with the carrier frequency. Accordingly, the carrier frequency is transformed to (a) deliver energy to the RX winding and (b) provide the desired signal information to the TX winding.

In order for the transmitter 320 to extract the desired signal, the transmitter 320 may separate the signal from the carrier frequency. The rectifier 324 may convert the TX voltage, which may comprise the carrier frequency mixed with the desired signal, into a voltage signal with DC component, a harmonic (e.g., $2^{nd}$ harmonic) of the carrier frequency, and the envelop components. The first low-pass filter 326 may remove the harmonic (e.g., $2^{nd}$ harmonic) of carrier frequency at location (5) shown in FIG. 3. High pass filter 328 may then be configured to remove a DC bias of signal at location (6), leaving an AC signal, which may be passed through a second low pass filter 330, wherein the resulting signal at location (7) may represent the envelop signal that contains the information from the receiver 300. In one embodiment, the signal at location (7) may be subjected to a voltage lifter to avoid negative voltage at location (8). This signal may then be provided to comparator 335 for comparison with a reference voltage 334 to recover the desired signal.

The circuitry of FIG. 3 may be configured in a multitude of ways to control the generation of a desired signal from comparator 336. These configurations may be varied and determined by numerous characteristics including, but not limited to, (1) the resistance of 308 and RDS(on) of 310 in the load modulation element 306,
(2) the distance between the TX winding 322 and RX winding 302,
(3) transmission characteristics of TX winding 322 and RX winding 302,
(4) the characteristics of the first low pass filter 326 and high pass filter 328,
(5) the characteristics of the second low pass filter 330, and
(6) characteristics of the voltage lifter and the reference voltage used.

The characteristics of the TX winding 322 and RX winding 302 (factor (3)) may be determined by coil design (e.g., the material used and configuration of windings), and the characteristics of the first low pass filter 326 and high pass filter 328 (factor (4)) may be tailored to a specific carrier frequency and DC voltage. As mentioned previously, the resistance of 308 in the load modulation element 306 (factor (1)) determines the strength of the desired signal delivered to the TX winding 322. The smaller the resistance is, the stronger the signal. The second low pass filter 330 may be configured to attenuate or enhance the strength of signal delivered to the comparator.

Accordingly, if factors (1), (5) and (6) are configured to accommodate the transmission characteristics of TX winding 322 and RX winding 302 (factor (3)), the comparator 336 may generate a desired signal when TX winding 322 is sufficiently close to RX winding 302. One function of the desired signal is to enable the wireless power delivery in an illustrative embodiment. In other words, the distance for enabling wireless charging between the TX winding 322 and RX winding 302 may be controllable based on the load modulation technique described herein. This may be advantageous for customizing charge-enable distances for transmitters and receivers to provide more efficient operation.

Figure 4:
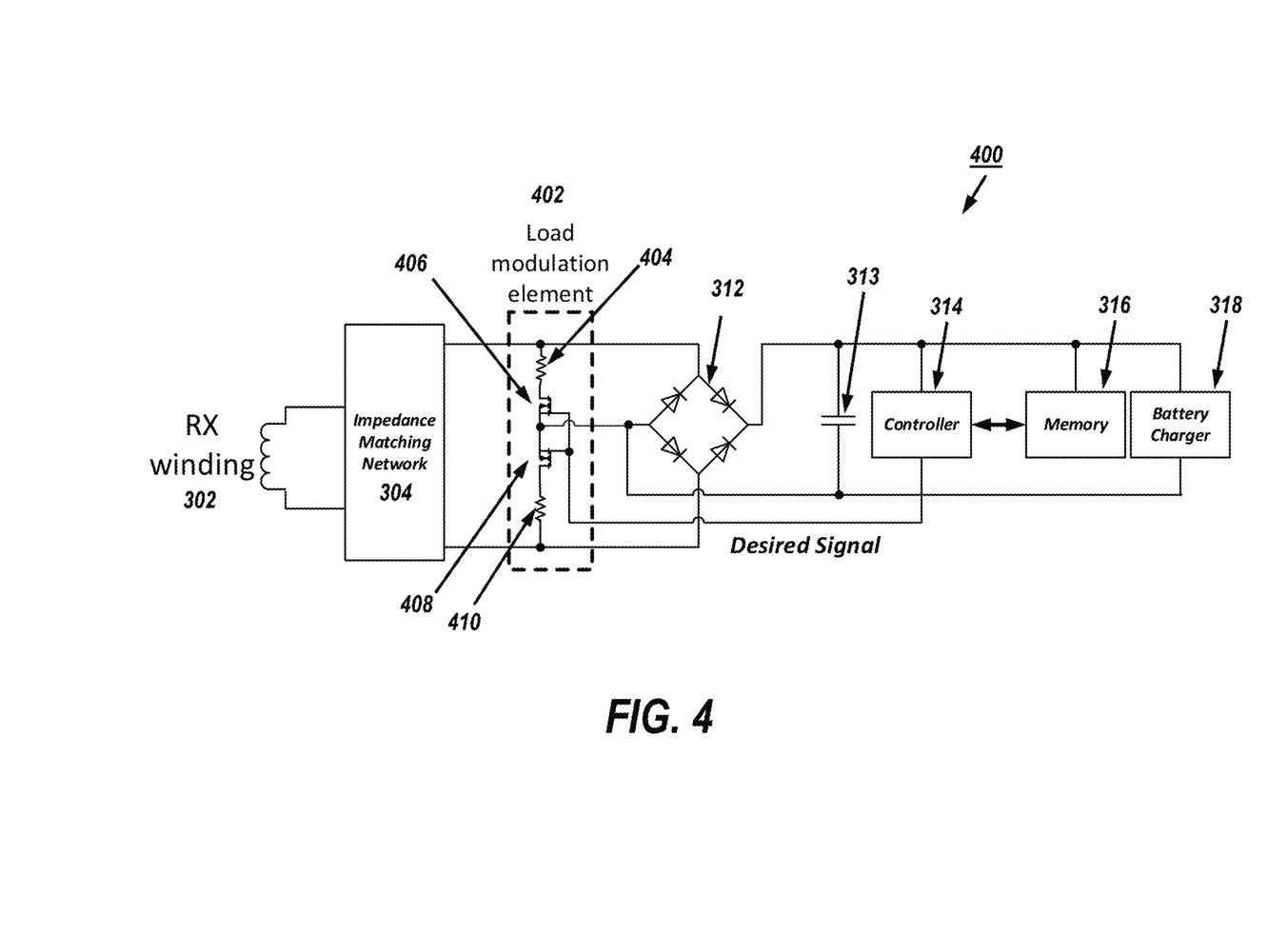
FIG. 4 shows a receiver (RX) circuit having a load modulation circuit in an illustrative embodiment.

Turning to FIG. 4, another illustrative embodiment is shown of a receiver 400 that is similar to receiver 300 illustrated in FIG. 3, but is configured with a load modulation element 402 having a first switch circuit, comprising resistor 404 and switch (e.g., MOSFET) 406 coupled to one terminal of impedance matching network, and a second switch circuit comprising resistor 410 and switch (e.g., MOSFET) 408 coupled to another terminal of impedance matching network 304. The gate terminals of switches 406 and 408 may both be coupled to controller 314. During operation, controller may control the switching of switches 406 and 408 such that 402 can increase the strength of load modulation signal compared with 306, wherein the cost for this improvement is an extra switch and resistor. Here, 404, 410 may be configured having the same value or different values.

The configurations described herein provide numerous advantages over conventional charging circuits. One such advantage is that the load modulation may control the charging enable distance between the target devices (e.g., receiver 300) and charging pad (e.g., transmitter 320). In single coil systems, when the target device moves close to TX windings, the comparator 336 may be configured to generate a desired signal to enable the wireless charger to start charging process. In multi-coil systems, using the load modulation configurations described herein, the target device may only wake up one or several TX windings that are "close enough". Thus, this method can greatly improve the system efficiency.

Another advantage is that load modulation may provide a secured charging environment based on transmitter/receiver winding structure and/or hardware. In one illustrative embodiment communication between TX winding 322 and RX winding 302 may be based on a Bluetooth specification. However, the Bluetooth protocol is well-known and susceptible to hacking from unauthorized users of a charging system. By using the load modulation techniques described herein an additional level of security is provided. Yet another advantage is that load modulation can provide critical status information of the receiver such that the WPT system can be constantly tuned to operate at an optimal working point dynamically in real time.

As mentioned above, the comparator's ability to generate a desired signal may be dependent upon a multitude of factors (e.g., (1)-(6)). In one illustrative embodiment, if factors (1), (5) and (6) are based on transmission characteristics of TX winding 322 and RX winding 302 (factor (3)), the enablement of charging via the desired signal is dependent upon the hardware configuration of the devices being charged. Thus, if one or more of factors (1), (5) and (6) are mismatched for a particular transmitter, the transmitter may not generate a power signal. If the modulation frequency is mismatched, the desired signal generated from receiver 300 may be filtered out by the first low pass filter 326 and/or the high pass filter 328 of the transmitter 320.

Additional care should be taken to ensure that resistance of resistor 308 of load modulation element 306 is set at a proper value. When the resistance is too large, the signal may be too weak to trigger the comparator 336 of transmitter 320. When the resistance of 308 is too small, the transmission losses in power delivery may increase, causing potential thermal and efficiency issues. Having too small of a resistance in 308 may also impact the voltage across windings and cause the envelope to change too much.

In some illustrative embodiment, the TX winding 322 should match RX winding 302 to avoid issues in the wireless coupling, which in turn may cause the desired signal to be hard to detect which may prevent the comparator from activating. The characteristics of the second low pass filter 330 (factor (5)) should be configured to attenuate or enlarge in a proper frequency range. If not, the noise may be enlarged or the signal may be excessively attenuated, which may prevent the comparator from activating, and/or cause the comparator to activate on an undesired signal. The characteristics of the voltage lifter 332 and the reference voltage 334 used should be configured to determine the trigger level of comparator 336. If not correctly set, the comparator would not be triggered correctly.

One skilled in the art should appreciate that one or more of the six factors discussed above may be used to secure wireless power transmission. In one illustrative embodiment, the mismatching of a factor may cause the comparator to fail to activate and thus prevent the transmitter 320 from providing wireless power.

Figure 5A:
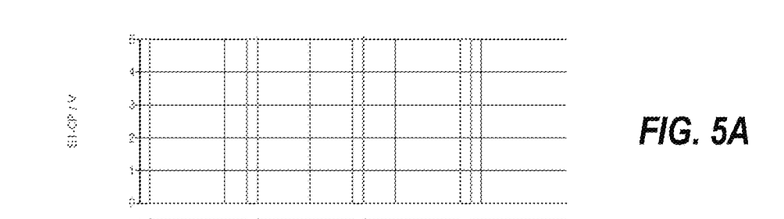
FIGS. 5A-5H show various simulated waveforms of circuit voltage responses over time under illustrative embodiments.
Figure 5B:
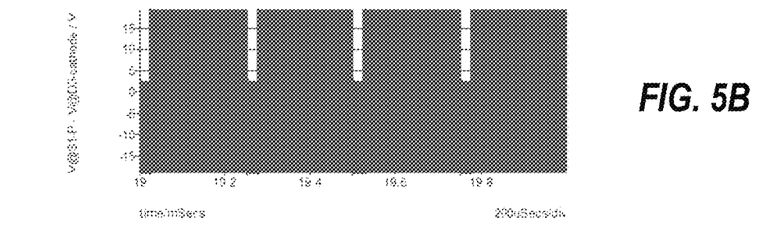
Figure 5C:
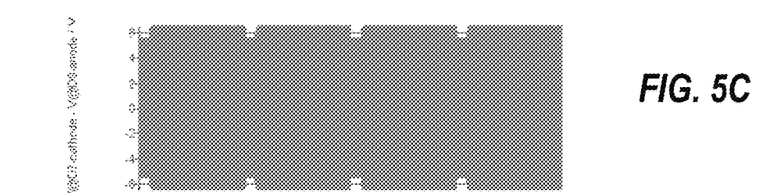
Figure 5D:
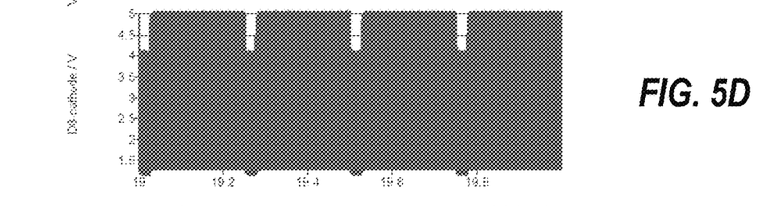
Figure 5E:
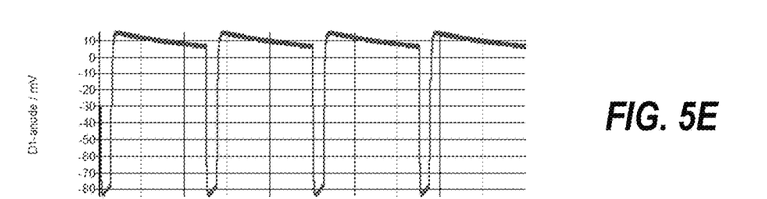
Figure 5F:
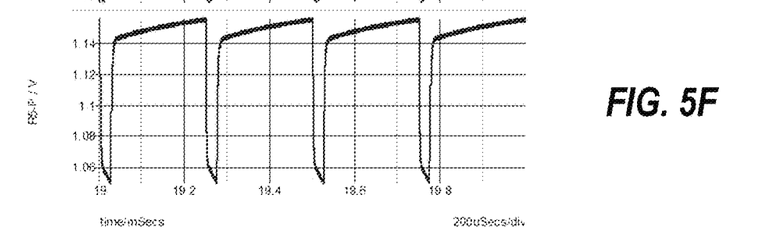
Figure 5G:
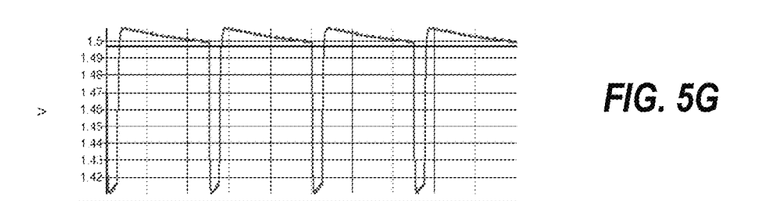
Figure 5H:
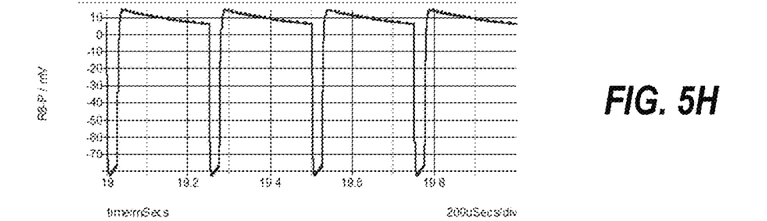

Turning to FIGS. 5A-5H, various simulated waveforms are provided showing circuit voltage responses over time under illustrative embodiments. FIG. 5A illustrates a desired signal at location (1) in FIG. 3. FIG. 5B illustrates the voltage at location (2) across the diode bridge in FIG. 3. When switch 310 is on, this voltage is low, and when switch 310 is off, this voltage is high. FIG. 5C illustrates the voltage across TX winding at location (3) discussed above in connection with FIG. 3. Its envelope shows the impact of load modulation. FIG. 5D illustrates the rectified voltage at location (4) of TX winding of FIG. 3. FIG. 5F illustrates the load modulation signal at location (5) without carrier frequency. FIG. 5E illustrates the load modulation signal at location (6) without DC bias voltage after high pass filter. FIG. 5H illustrates the signal that may be attenuated or enhanced at location (7) by low pass filter 2, and may have negative voltage. FIG. 5G includes two signals, one is the load modulation signal (at location (8) in FIG. 3), and the other one is the reference voltage for comparator (at location (9) in FIG. 3). The signal at location (8) in FIG. 3 is after voltage lifter, and may not have a negative voltage. The desired signal similar to the one shown in FIG. 5A can be then generated by the comparator 336.

In the foregoing detailed description, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. A wireless charging system, comprising:
a power transmitter configured to generate wireless energy for electrical power;
a power receiver configured to receive wireless energy for electrical power at a predetermined carrier frequency that is configured to be one of fixed or tuned during operation; and
a controller, operatively coupled to the power receiver, wherein the controller is configured to activate when the power receiver receives the wireless energy, and wherein the controller is configured to control a load modulation element to generate one or more signals comprising information associated with system operation and performance optimization, and wherein the one or more signals are transmitted via the power receiver.

2. The wireless charging system of claim 1, wherein the power transmitter comprises:
a demodulation circuit;
a filter circuit;
a comparator circuit; and
digital signal processing circuitry.

3. The wireless charging system of claim 2, wherein the power transmitter is configured to receive and filter the one or more signals transmitted by the receiver via the filter circuit, and compare the filtered one or more signals to a reference voltage in the comparator circuit.

4. The wireless charging system of claim 1, wherein the power receiver comprises a modulator circuit.

5. The wireless charging system of claim 1, further comprising communications circuitry configured to provide secure communication between the power transmitter and power receiver, wherein the secure communication is through a winding structure of the power transmitter and the power receiver.

6. The wireless charging system of claim 5, wherein the communication circuitry is configured to provide secure communication comprising an authentication signal.

7. The wireless charging system of claim 1, wherein the wireless energy is configured to be initiated at a distance between the power receiver and the power transmitter depending on specific transmitter and receiver winding structure and/or hardware.

8. The wireless charging system of claim 7, wherein the power transmitter is configured to generate wireless energy using a portion of the power transmitter at the distance between the power receiver and the power transmitter.

9. A method for operating a wireless charging system, comprising:
configuring a power transmitter to generate wireless energy for power;
configuring a power receiver to receive wireless energy for power at a predetermined carrier frequency configured to be one of fixed or tuned during operation;
activating a controller, operatively coupled to the power receiver, when the power receiver receives the wireless energy;
controlling, via the controller, a load modulation element to generate one or more signals comprising information associated with system operation and performance optimization, and wherein the generated one or more signals are transmitted via the power receiver.

10. The method of claim 9, wherein the power transmitter comprises a demodulation circuit, a filter circuit, a comparator circuit, and digital signal processing circuitry.

11. The method of claim 10, further comprising:
receiving and filtering, via the power transmitter, the one or more signals transmitted by the receiver via the filter circuit; and
comparing, via the comparator circuit, the filtered one or more signals to a reference voltage.

12. The method of claim 9, wherein the power receiver comprises a modulator circuit.

13. The method of claim 9, further comprising providing, via communications circuitry, secure communication between the power transmitter and power receiver, wherein the secure communication is through a winding structure of the power transmitter and the power receiver.

14. The method of claim 13, wherein the providing secure communication comprises communicating an authentication signal.

15. The method of claim 9, wherein configuring the power transmitter to generate wireless energy comprises configuring the power transmitter to initiate wireless energy at a distance between the power receiver and the power transmitter depending on specific transmitter and receiver winding structure and/or hardware.

16. The method of claim 15, wherein configuring the power transmitter to generate wireless energy comprises configuring the power transmitter to generate wireless energy using a portion of the power transmitter at the distance between the power receiver and the power transmitter.

17. A power receiver configured to receive wireless energy, comprising:
an input comprising one or more charging windings for receiving wireless energy for power at a predetermined carrier frequency configured to be one of fixed or tuned during operation;
a rectification circuit, operatively coupled to the input;
a load modulation circuit, operatively coupled to the rectification circuit; and
a controller, operatively coupled to the load modulation circuit, wherein the controller is configured to activate when the input receives the wireless energy, and wherein the controller is configured to control a load modulation element to generate one or more signals comprising information associated with system operation and performance optimization, and wherein the one or more signals are transmitted via the charging windings.

18. The power receiver of claim 17, further comprising communications circuitry configured to provide secure communication between the power receiver and a power transmitter, wherein the secure communication is through a winding structure of the power receiver.

19. The power receiver of claim 18, wherein the communication circuitry is configured to provide secure communication comprising an authentication signal.

20. The wireless charging system of claim 17, wherein the input is configured to receive further wireless energy in response to the transmission of the one or more signals.

* * * * *